United States Patent [19]
Savory et al.

[11] Patent Number: 5,152,889
[45] Date of Patent: Oct. 6, 1992

[54] DRIP PIPE FOR APPLICATION OF WASH LIQUID TO FILTER SURFACES

[75] Inventors: Rudolph R. Savory, Chatham, N.J.; James D. Eagan, Woking, England

[73] Assignee: Exxon Research and Engineering Company, Florham Park, N.J.

[21] Appl. No.: 802,159

[22] Filed: Dec. 4, 1991

[51] Int. Cl.$^5$ .............................................. B01D 33/60
[52] U.S. Cl. .................................. 210/209; 210/217; 239/501; 239/520
[58] Field of Search ............... 210/209, 216, 217, 772; 239/501, 520, 523

[56] References Cited

U.S. PATENT DOCUMENTS

| | | | |
|---|---|---|---|
| 3,729,414 | 4/1973 | Harris et al. | 210/217 |
| 4,008,154 | 2/1977 | Richards et al. | 210/217 |

Primary Examiner—Robert A. Dawson
Assistant Examiner—Matthew O. Savage
Attorney, Agent, or Firm—Joseph J. Allocca

[57] ABSTRACT

A wash liquid distributor is described for applying liquid uniformly across a filter cake on a filter surface providing effective washing and exhibiting resistance to clogging and fouling. The wash liquid distributor consists essentially of, in combination, at least one elongated hollow distributor pipe mounted above the filter surface through which wash fluid is passed, each hollow distributor pipe having a multiplicity of closely, evenly spaced and axially aligned small holes located substantially along the top center line of said pipe and pointing away from the filter surface located beneath said pipe, an inner helical wire wrap around said pipe, the pitch of the winding of said wire being substantially the same as the spacing of the axially aligned holes and whereby each individual turn in the winding is spaced to pass substantially midway between adjacent pairs of the evenly spaced, axially aligned holes, a curved deflector plate located on top of the inner helical wire wrap and covers a portion of the circumference of said pipe, the center line of the deflector plate being substantially in alignment with the top center line of the pipe, and a final outer helical wire winding around the pipe holding the deflector plate in position, the pitch of the winding of this outer helix being substantially the same as the inner helix winding but about 180° out of phase.

7 Claims, 1 Drawing Sheet

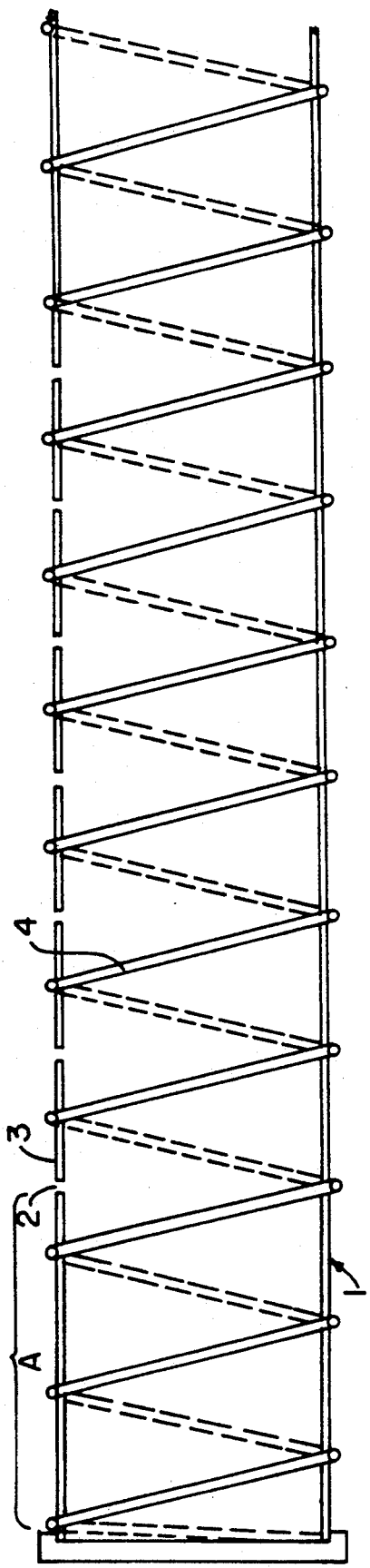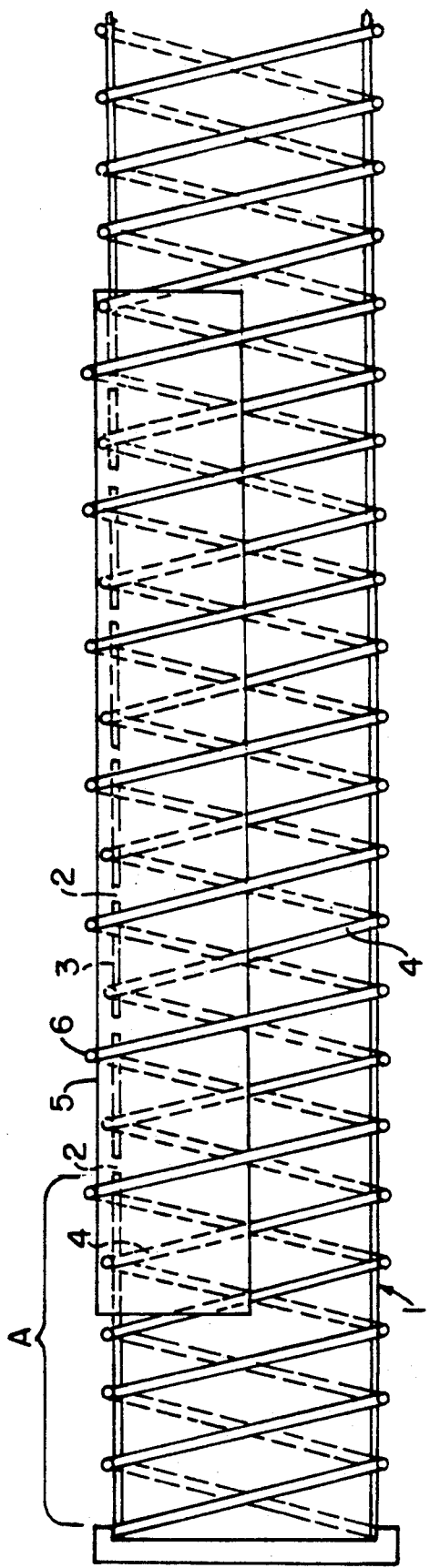

DRIP PIPE FOR APPLICATION OF WASH LIQUID TO FILTER SURFACES

BACKGROUND OF THE INVENTION

1. Field of the Invention

The present invention is directed to a wash liquid distributor for applying wash liquid uniformly across a filter cake on a filter surface, preferably a rotary filter surface, providing effective washing, the wash liquid distributor exhibiting resistance to clogging and fouling.

2. Description of the Related Art

In utilizing filters and especially rotary drum filters it is usually necessary that the solid particles deposited on the filter surfaces from the filtered liquid must be washed to remove any entrained mother liquid remaining in or on the solid deposited particles. This serves the two fold purpose of recovering additional mother liquid and producing a cleaner cake of solid deposited particles which are subsequently recovered from the filter surface.

In washing the solid deposited particles it is necessary that as fine and uniform a wash layer as possible be applied to the surface to prevent undue disturbing of the particle layer (hereinafter cake) so as to prevent uneven washing and channeling of the wash liquid. Channeling occurs when wash liquid finds a path of reduced resistance to flow in the cake and preferentially follows that path rather than being drawn evenly and uniformly through the entire cake.

Numerous arrangements and devices have been devised and suggested for evenly disposing wash liquid on filter cakes. See for instance U.S. Pat. No. 949,724, U.S. Pat. No. 1,059,327, U.S. Pat. No. 1,475,244, U.S. Pat. No. 2,092,111, U.S. Pat. No. 2,202,932, U.S. Pat. No. 2,698,687, and U.S. Pat. No. 3,215,277.

U.S. Pat. No. 3,729,414 teaches a wash distributor system wherein distribution pipes are fed with liquid from several entry points and the liquid flows outwardly through small holes in the pipes and runs down and around grooving and drips off the bottom of the pipe. In such a distributor only a very small pressure can be used since the liquid must flow around the pipe rather than jetting out of the small holes. Thus, since very little pressure can be applied to the distributor pipe in the invention, it is not possible to obtain optimum distribution along the pipe and distribution will be disturbed by changes in wash flow rates.

The process to which U.S. Pat. No. 3,729,414 was directed is a process for removal of wax crystals from lubricating oils. In that process, oil is dissolved in solvent and chilled to form wax crystals which are then removed by filtration. As will be appreciated, the wax crystals are soft and consequently the spaces between the crystals may be easily blinded by physical contact. If the wash liquid leaves the distributor pipes at a high velocity, it can impact against the cake with sufficient force to dislodge it or to cut channels in it and thereby prevent uniform washing.

Filters can also be provided with spray nozzles mounted on distributor pipes. Since spray nozzles create relatively high velocity sprays, reasonably even distribution of liquid is possible at the outlet of the spray nozzles. However, the high velocities with which the spray issues have detrimental effects on the cake porosity and are undesirable. At the same time wash rates can vary widely depending on the nature of the wax crystals. When this occurs, the shape of the spray will change with the liquid pressure and coverage by the spray nozzles will be dependent upon the wash rate. Accordingly, at low wash rates poor coverage of the cake and poor washing often occurs.

U.S. Pat. No. 4,008,154 teaches a much improved wash distribution system for use in rotary filters. Distribution occurs in the form of a multiplicity of continuous narrow pools of liquid which are laid down with a minimum disturbance of the porosity of the filter cake.

Application of the wash liquid to the cake takes place in a three-step process. First, a uniform distribution of the wash liquid along the distributor pipe is provided by using a higher than usual pressure and creating a multiplicity of jets exiting from small holes axially spaced along the pipe and facing away from the filter cake. Thereafter, the kinetic energy of the jets is damped out in a diffusion channel adjacent to the jets and extending around the exterior of the pipe.

This diffusion channel is defined as the space bounded by the exterior of the pipe and a solid cover partially surrounding the pipe and overlaying the holes. The channel contains a coarse mesh screen positioned so as to present its edge to liquid passing through said channel whereby liquid jets produced by the holes are dampened and the liquid diffuses throughout the channel. Overwrap means in the form of a helical coil of wire secure the cover to the pipe and serve to collect and redistribute the liquid exiting from the channel at a plurality of spaced drip points along the bottom of the pipe. Liquid accumulating at the drip points falls from the drip points of its own weight under the influences of gravity.

Thus it is seen that in the current art both spray nozzles and drip pipes are used to apply wash liquid to filter cake, in particular to wax cakes.

Both spray nozzles and current drip pipe designs suffer from fouling of small internal clearances by debris from upstream plant, such as products of corrosion, which are in fine particulate form, too fine to be removed economically by normal commercial strainers. The effect of fouling of spray nozzles and drip pipes is a reduction in the distribution efficiency of the wash liquid to the wax cake, leaving some parts of the wax cake unwashed or only partially washed, thereby losing filtrate yield and leaving oil in the wax cake.

It would be highly beneficial if a liquid distributor could be designed which produces an even stream of low velocity wash liquid and which does not clog or foul as a result of the presence of contaminants present in the wash liquid.

SUMMARY OF THE INVENTION

A wash liquid distributor is described for applying wash liquid uniformly across a filter cake on a filter surface providing effective washing and exhibiting resistance to clogging and fouling. The wash liquid distributor consists essentially of, in combination, at least one elongated hollow distributor pipe mounted above the filter surface through which wash fluid is passed, each hollow distributor pipe having a multiplicity of closely, evenly spaced and axially aligned small holes located substantially along the top center line of said pipe and pointing away from the filter surface located beneath said pipe, an inner helical wire wrap around said pipe, the pitch of the winding of said wire being substantially the same as the spacing of the axially aligned holes and wherein each individual turn in the winding is spaced to pass substantially midway between adjacent pairs of the evenly spaced, axially aligned holes, a curved deflector plate located on top of the inner helical wire wrap and covering a portion of the circumference of said pipe, the center line of the deflector plate being substantially in alignment with the top center line of the pipe, and a final outer helical wire winding around the pipe holding the deflector plate in position, the pitch of the winding of this outer helix being substantially the same as the inner helix winding but about 180° out of phase.

DESCRIPTION OF THE DRAWINGS

FIG. 1 presents a schematic of the liquid distributor showing the elongated hollow distribution pipe, the location of evenly spaced axially aligned holes in said pipe and the inner helical wire wrap.

FIG. 2 presents a schematic of a complete liquid distribution showing the distributor pipe, axially aligned holes, inner helical wire wrap, curved deflector plate and outer helical wire wrap.

DESCRIPTION OF THE PREFERRED EMBODIMENTS

A wash liquid distributor for applying wash liquid to filter cakes deposited on filter surfaces, preferably waxy filter cakes deposited on filter surfaces, most preferably wax filter cakes deposited on rotary filter surfaces is described which consists essentially of, in combination, at least one elongated hollow distributor pipe, mounted above the filter surface, through which wash liquid is passed, said pipe having a multiplicity of closely and evenly spaced and axially aligned small holes located substantially along the top center line of said pipe and pointing generally away from the filter surface over which it is located, an inner helical wire wrap around said pipe, said inner helical wire wrap having a winding pitch substantially the same as the spacing of the closely and evenly spaced and axially aligned holes in said pipe and whereby each individual turn in the winding is spaced to pass substantially midway between adjacent pairs of evenly spaced axially aligned holes, a curved deflector plate located on top of the inner helical wire wrap and covers a portion of the circumference of the pipe, the center line of the deflector plate being in substantial alignment with the row of closely and evenly spaced and axially aligned small holes in the pipe located substantially along the top center line of said pipe and a final outer helical wire winding around the pipe holding the deflector plate in position on the pipe, the pitch of the winding of the outer helix being substantially the same as that of the inner helix winding but about 180° out of phase.

The hollow distributor pipe may be of any desired length and any desired interior diameter, the size being finally determined by the practitioner in response to the amount of wash liquid which is needed to be applied to the filter cake on the filter surface to achieve the desired level of cake wash.

When used to distribute wash liquid upon a filter cake deposited on the filter surface of a rotary drum filter the hollow distributor pipe has preferably at least the same length as that of the rotary drum filter and the axis of the distributor pipe is preferably parallel to the axis of rotation of the drum.

Typical wash rates for rotary drum filters are in the approximate range of 0.2 to 2.0 gallons per minute preferably 0.2 to 1.0 gallons per minute per linear rotational foot of the filter cake surface.

The closely and evenly spaced generally axially aligned holes located substantially along the top center line of the distributor pipe are from about 0.01 to 0.2 inches in diameter preferably about 0.03 to 0.1 inches in diameter depending on the wash liquid capacity requirements and the need to maintain a positive pressure within the pipe relative to that at the pipe exterior. Typically the pressure within the pipe is 2-5 psi greater than that at the pipe exterior.

The spacing between adjacent holes is selected so as to provide as even and uniform a distribution of liquid upon the filter cake as possible. Spacing between adjacent holes can range from about 0.25 to 3 inches, preferably 0.5 to 2.0 inches, most preferably 1.0 inch.

The wire used to produce the inner helical wire wrap has a diameter of about 1/16 to 3/16 inch, preferably 1/16 to ⅛ inch and may be made of any material which is resistant to corrosion in the environment of use. Wire made from copper, steel, or even plastic, such as single filament polyethylene, polypropylene or nylon can be employed.

The wash liquid is fed to the pipe under a pressure sufficient to jet a large-enough volume of fluid through the axially aligned holes to effectively wash the filter cake on the filter surface. The pressure is again set by the dimensions of the pipe, the hole size, the size of the filter cake surface to be washed, the degree of washing needed being left to the practitioner to set on a case by case basis.

To insure that the small diameter holes in the pipe do not plug, a strainer should be installed in the wash solvent supply line upstream of the drip pipe. Strainers of about 75 to 200 micron mesh screen size can be used. The strainer preferably employs the lighter mesh (e.g. about 75 micron mesh) and may also utilize magnetic bars which fit within the strainer basket to remove the major ferrous metal particles in the recirculating wash solvent, thus reducing the load on the mesh of the strainer.

The deflector plate located on top of the helical wire wrap and covering a portion of the circumference of said pipe, the center line of which deflector plate being substantially in alignment with the row of evenly spaced axially aligned holes which are substantially located along the top center line of the pipe can be made of any appropriate material sufficiently strong to withstand prolonged exposure to the wash liquid jets emanating from the axially aligned holes. This deflector plate is solid, as it is clear that a permeable or porous plate would be penetrated by the liquid jet and substantial control over the wash liquid would be lost.

The plate may be made of any metal, plastic or ceramics material which is resistant to corrosion in the environment of use.

This plate typically covers from 90° to 270° preferably 180° of the 360° of circumference of the pipe and is in close contact with the inner helical wire winding in the pipe. The deflector plate does not extend around the bottom of the pipe. This area is left open to permit passage, collection, and distribution of the wash fluid on the filter cake.

The deflector plate is held in position on the hollow distributor pipe and in contact with the inner helical wire winding by a tight fitting outer helical winding of wire. The outer helical winding of wire holds the deflector plate in place and, where it passes in contact with the exposed bottom portion of the hollow distributor pipe, serves as additional fluid accumulation drip points in conjunction with the inner helical winding which serves the dual purpose of spacers between the pipe and the deflector plate and as fluid accumulator drip points.

The outer helical winding wire may be of the same or different material as that used for the inner helical wire winding. Preferably the wire used for the inner and outer helical windings are of the same material and of the same diameter, because this assists in or contributes to even distribution of wash fluid leaving the drip points.

The inner and outer helical windings are preferably secured to the hollow distributor pipe to prevent shifting. The attachment can take the form of tack welding the windings to the pipe along the bottom center line of the pipe. Each turn of the helical winding need not be tack welded, it being sufficient to tack weld every 4th to 8th, preferably every 6th turn of each helical winding.

If non metallic wire is used, a suitable adhesive may be employed. In dewaxing operations using, for example, methylethylketone, methylisobutylketone and mixtures thereof, mixtures of ketone with aromatic hydrocarbons as wash solvent, a suitable adhesive can be selected from among those described in U.S. Pat. No. 4,464,494. See also U.S. Pat. No. 4,908,082.

FIG. 1 presents a schematic of the hollow distributor pipe and inner helical winding of wire.

A hollow distributor pipe approximately 2 inches in diameter (1), drilled, tapped, drilled and tapped or cast with generally evenly spaced holes of about 1/32 inch diameter (2) spaced approximately 1 inch apart (3) in center along the axial center top line of the pipe is wrapped with a helix of wire (4) approximately ⅛ inch in diameter with a helix pitch approximately the same as that of the spacing between adjacent holes (1 inch pitch). The wire coil crosses the top center line midway between adjacent holes. Approximately 3 inches (A) at each end of the hollow distributor pipe is unpierced by holes and is used to accommodate and secure several turns of the wire helix. If the hollow distributor pipe is brass the wire helix can be copper. If the pipe is stainless steel, the wire should be stainless steel to avoid any galvanic action at the contact points.

FIG. 2 shows the assembly of FIG. 1 further including a deflector plate (5) covering approximately the top 180° of the distributor pipe and fitting closely against the turns of the inner helix of wire. A second helix of wire (6) (outer helix) of the same diameter as the inner helix is wrapped around the assembly to hold the deflector plate in position and to provide additional accumulation drip points along the lower portion of the distributor pipe from which will drip wash liquid onto the filter cake. This outer helix is of approximately the same pitch as the inner helix but offset 180° so that its turns cross the distributor pipe approximately midway between the turns of the inner helix but preferably do not cross over the turns of the inner helix, that is, the winding have the same screw turn direction (right hand screw or left hand screw). Thus, if the inner helix is 1 inch pitch, right hand screw, the outer helix also is of 1 inch pitch, right hand screw, but offset 180°. Both the inner and outer helix wire windings are attached to the distributor pipe by tack welding approximately every linear foot of pipe with a six inch offset between the tack points of each helix.

Typical industrial drip pipes are up to 30 feet in length and 2 inches internal diameter with as many as 6 to 8 such pipes arranged over a single rotating filter drum.

When employed over rotary drum filters more than one drip pipe may be employed in series such that their drip patterns are staggered to overlay each other producing an even coverage and distribution of wash liquid over the filter cake on the filter surface.

The drip pipe can be single ended such that all wash liquid entering the pipe exits the pipe through the holes. Alternatively, if multiple pipes are used, they can be ganged with part of the flow from the first pipe operating as wash feed to the second pipe. The last pipe in any ganged series can be single ended to create a closed circuit insuring that all wash liquid entering the gange of pipes exits through the holes in the pipes.

The drip pipe functions in such a way that wash liquid flows from the hollow distributor pipe, connected to a pressurized supply of wash liquid, through the 1/32 inch diameter holes spaced at one inch intervals along the top center line of the pipe, and is deflected by the inner surface of the deflection plate and flows down the outside of the pipe, being channeled by the inner helix wire wrap and collecting at the low points along the bottom center line of the pipe, provided by the inner and outer helix coils of wire windings. The best distributor wash pattern was obtained when 1/8 inch diameter wire was used for both inner and outer helix wire winding wrap on a one inch pitch with 180° set off between inner and outer winding providing a ½ inch spacing between wire turns of each helix.

As compared to the device of U.S. Pat. No. 4,008,154 which employs a flow dampening screen of wire mesh underlaying the deflector plate, in the present invention no horizontal obstructions are present to form the foundation for build-up of fine particulate matter and flow can continue unobstructed indefinitely. By using 1/32 diameter distribution holes along the top center of the inner pipe, a pressure of several psig is required to distribute typically required wash solvent rates. With this positive pressure inside the inner pipe, horizontal alignment of the drip pipe is not a problem, tests at inclinations up to 5° from horizontal having been carried out and shown to have no detrimental effect on wash distribution pattern from the drip pipe.

The drip pipe of the present invention permits the production of waxes with a much improved, i.e., lower oil content. Whereas the oil in wax content of a 175N wax produced using the device of U.S. Pat. No. 4,008,154 was about 4%, the oil in wax content of a 175N wax washed using the drip pipe of the present invention was about 2.5% at the same wash ratio, all other conditions being equivalent except for the use of the two different drip pipes. This reduced oil content is a significant improvement in the quality of the wax and markedly enhances the value of the wax for sale.

What is claimed is:

1. A wash liquid distributor for applying wash liquid onto a filter cake deposited on a filter surface comprising in combination: at least one elongated hollow distributor pipe mounted above the filter surface through which distributor pipe wash liquid is passed, each hollow distributor pipe having a multiplicity of closely, evenly spaced and axially aligned small holes located substantially along the top center line of said pipe and pointing away from the filter surface located beneath said pipe, an inner helical wire wrap around said pipe, the pitch of the winding of the wire being substantially the same as the spacing of the axially aligned holes and wherein each individual turn in the winding is spaced to pass substantially midway between adjacent pairs of the evenly spaced axially aligned holes, a curved solid deflector plate located on top of the inner helical wire wrap and covering a portion of the circumference of said pipe, the center line of the solid deflector plate being substantially in alignment with the top center line of the pipe, and a final outer helical wire winding around the pipe holding the deflector plate in position, the pitch of the winding of the outer helix being substantially the same as the inner helix winding but about 180° out of phase.

2. The wash liquid distributor of claim 1 wherein the closely and evenly spaced axially aligned holes are from about 0.01 to 0.2 inches in diameter.

3. The wash liquid distributor of claim 1 wherein the closely and evenly spaced axially aligned holes are about 0.25 to 3 inches apart.

4. The wash liquid distributor of claim 1 wherein the wire used to produce the inner helical wire wrap is about 1/16 to 3/16 inch in diameter.

5. The wash liquid distributor of claim 1 wherein the curved solid deflector plate covers from 90° to 270° of the 360° of circumference of the pipe.

6. The wash liquid distributor of claim 1 wherein the wire used to produce the outer helical wire wrap is made of the same material as the wire used to produce the inner helical wire wrap and is of the same diameter.

7. The wash liquid distributor of claim wherein the inner and outer helical wire wraps are of the same screw turn direction.

* * * * *